US012345267B2

(12) United States Patent
Hut

(10) Patent No.: US 12,345,267 B2
(45) Date of Patent: Jul. 1, 2025

(54) MOBILE PUMP SYSTEM WITH METERING PUMP AND METHOD THEREFOR

(71) Applicant: HYTRANS BEHEER B.V., Lemmer (NL)

(72) Inventor: Robert Dirk Hut, Lemmer (NL)

(73) Assignee: HYTRANS BEHEER B.V., Lemmer (NL)

(*) Notice: Subject to any disclaimer, the term of this patent is extended or adjusted under 35 U.S.C. 154(b) by 191 days.

(21) Appl. No.: 17/760,841

(22) PCT Filed: Sep. 17, 2020

(86) PCT No.: PCT/NL2020/050577

§ 371 (c)(1),
(2) Date: Mar. 16, 2022

(87) PCT Pub. No.: WO2021/060976

PCT Pub. Date: Apr. 1, 2021

(65) Prior Publication Data

US 2022/0341430 A1 Oct. 27, 2022

(30) Foreign Application Priority Data

Sep. 24, 2019 (NL) ...................................... 2023888

(51) Int. Cl.
*F04D 13/12* (2006.01)
*A62C 5/02* (2006.01)
(Continued)

(52) U.S. Cl.
CPC ................ *F04D 13/12* (2013.01); *A62C 5/02* (2013.01); *A62C 25/00* (2013.01); *A62C 27/00* (2013.01);
(Continued)

(58) Field of Classification Search
CPC . F04B 1/00; F04D 13/12; F04D 13/16; F04D 29/42; F04D 19/60; A62C 5/02; A62C 25/00; A62C 27/00
See application file for complete search history.

(56) References Cited

U.S. PATENT DOCUMENTS 4,743,430 A * 5/1988 Spielholz .............. B05B 7/0025 417/364
5,240,078 A 8/1993 Worthington
(Continued)

FOREIGN PATENT DOCUMENTS

| | | | |
|---|---|---|---|
| DE | 29903572 | U1 | 7/1999 |
| JP | 2008093199 | A | 4/2008 |
| JP | 201069455 | A | 4/2010 |

OTHER PUBLICATIONS

International Search Report and Written Opinion for the International Patent Application No. PCT/NL2020/050577, mailed Nov. 23, 2020, 12 pages.

*Primary Examiner* — Connor J Tremarche
(74) *Attorney, Agent, or Firm* — KDW Firm PLLC

(57) ABSTRACT

A mobile pump system for pumping water for extinguishing with an auxiliary agent, and a method therefor. The mobile pump system includes a frame for housing the pump system, a booster pump arranged in the frame, a metering pump arranged in the frame for the purpose of adding an auxiliary agent to a water flow, and a drive configured to drive the booster pump and the metering pump. The metering pump is provided with a displaceable metering pump frame and coupling means for connecting the metering pump to a container of the auxiliary agent.

16 Claims, 5 Drawing Sheets

(51) Int. Cl.

| | |
|---|---|
| ***A62C 25/00*** | (2006.01) |
| ***A62C 27/00*** | (2006.01) |
| ***F04B 1/00*** | (2020.01) |
| ***F04C 2/00*** | (2006.01) |
| ***F04D 13/16*** | (2006.01) |
| ***F04D 29/42*** | (2006.01) |
| ***F04D 29/60*** | (2006.01) |

(52) U.S. Cl.

CPC .................. *F04B 1/00* (2013.01); *F04C 2/00* (2013.01); *F04D 13/16* (2013.01); *F04D 29/42* (2013.01); *F04D 29/60* (2013.01)

(56) References Cited

U.S. PATENT DOCUMENTS

| | | | | |
|---|---|---|---|---|
| 6,571,882 | B2 * | 6/2003 | Yen ...................... | A62C 3/0292 169/44 |
| 2005/0023006 | A1 * | 2/2005 | Vonhof .................... | A62C 5/02 169/44 |
| 2005/0077057 | A1 * | 4/2005 | Laskaris ............... | F04D 29/669 169/24 |
| 2006/0207659 | A1 * | 9/2006 | Shaefer ................. | F04D 13/066 137/355.2 |
| 2011/0056708 | A1 | 3/2011 | Gamble et al. | |
| 2011/0056710 | A1 * | 3/2011 | Gamble ................ | H02P 29/032 169/44 |
| 2013/0253711 | A1 * | 9/2013 | McLoughlin ........... | F04B 17/05 700/282 |

* cited by examiner

MOBILE PUMP SYSTEM WITH METERING PUMP AND METHOD THEREFOR

This application is a national stage filing under 35 U.S.C. 371 of pending International Application No. PCT/NL2020/050577, filed Sep. 17, 2020, which claims priority to Netherlands Patent Application No. 2023888, filed Sep. 24, 2019, the entirety of which applications are incorporated by reference herein.

The present invention relates to a mobile pump system for pumping water (for extinguishing) provided with an additive, which is provided for this purpose with a metering pump. Such mobile pump systems are for instance utilized in emergency situations for fires at industrial complexes, such as refineries.

Mobile pump systems for pumping water which are known in practice make use of a frame provided with a so-called booster pump to be able to thereby displace water (for extinguishing) over relatively great distances. An additive, such as a foaming agent, is added separately to the water (for extinguishing).

US 2006/207659 A1 shows a pump system with one or more satellite pumps or feed pumps for supplying water to a main pump or booster pump. An additive can be injected into the water from a separate tank.

A problem with conventional pump systems is that foaming agent and/or other additives are usually not supplied in effective manner. This is particularly the case when a relatively large quantity of foaming agent is necessary, for instance in the case of oil well fires. In such situations the foaming agent usually forms about 1-6% of the total quantity of extinguishing agent. In the case that a pump system is provided which is suitable for pumping 30,000 litres of water per minute, about 300 litres of foaming agent is already necessary per minute when 1% foaming agent is added. This means that a standard container/IBC of foaming agent will be empty in just three minutes. In practice, this causes many problems due to the distance to such containers and the switching between containers with the foaming agent. In addition, such a foaming agent is relatively viscous and thereby difficult to set into motion. When relatively large tanks are used, it is particularly starting up that is a problem in practice. This usually requires an additional pressure pump. This entails additional components and maintenance, and may additionally even limit the reliability of the pump system.

The present invention has for its object to provide an improved mobile pump system whereby the above stated drawbacks are obviated or at least reduced, such that a source of fire, particularly an oil well fire, can be combatted effectively.

This object is achieved with a mobile pump system for pumping water and/or extinguishing agent according to the invention, wherein the mobile pump system comprises:

- a frame for housing the pump system;
- a booster pump arranged in the frame;
- a metering pump arranged in the frame for the purpose of adding an auxiliary agent to a water flow; and
- a drive configured to drive the booster pump and the metering pump,
- wherein the metering pump is provided with a displaceable metering pump frame and coupling means for connecting the metering pump to a container of the auxiliary agent; and
- further comprising a controller configured to control the booster pump and the metering pump.

The extinguishing agent is particularly water for extinguishing which is provided with an additive, particularly a foaming agent. Such a foaming agent is usually supplied separately. By providing the metering pump with a displaceable metering pump frame and associated coupling means the metering pump can be operatively connected to a container of the auxiliary agent, such that the auxiliary agent can be supplied to the water for extinguishing in effective manner. The metering pump frame is preferably provided here with wheels or other suitable displacing means.

The mobile pump system is further provided with a frame, preferably in the form of a container, for accommodating the various components of the pump system therein. These components are particularly a booster pump arranged in the frame for the purpose of pumping the water, one or more immersible pumps optionally arranged in the frame for the purpose of pumping up the water, and an associated drive for the pumps. Such a drive can for instance be a conventional drive with a relatively large drive for the booster pump and a relatively small drive, or a number of relatively small drives, for the other components of the mobile pump system. In an alternative embodiment the drive is provided with two drives, preferably of equal power, wherein a booster pump drive is aimed at driving the booster pump. A hydraulics drive is aimed at driving the other components of the mobile pump system. In such an embodiment the hydraulics drive can optionally be coupled via a coupling to the booster pump such that the hydraulics drive functions as auxiliary drive. It has been found that this greatly reduces exhaust emissions and noise emissions, or at least considerably reduces costs. In a currently preferred embodiment of the invention the hydraulics motor drive with hydraulic pumps is started. This is provided with a radiator cooling. As soon as water has been carried through the submersible pumps to the booster pump, the booster pump (diesel) motor drive of the booster pump is started. This preferably takes place automatically. The booster pump motor drive for the booster pump is then preferably cooled by water for extinguishing. This results in a compact system and produces a further noise reduction.

Said auxiliary agent is particularly a foaming agent. Such a foaming agent can be utilized in effective manner in for instance oil well fires.

According to the invention, the mobile pump system further comprises a controller for controlling the booster pump and the metering pump.

By providing a controller the assembly of booster pump and metering pump can be controlled in effective manner. It is hereby possible, among other things, to continuously monitor and control the mixing ratio. An adjustment of for instance a quantity of water (for extinguishing) thereby automatically results in an adjustment of the quantity of admixed auxiliary agent. This prevents an operator from having to adjust this manually. This further has the advantage that it is prevented that an excess of auxiliary agent is pumped, which will have to be carried back to the supply container of the auxiliary agent, for example. In the case for instance a foaming agent, such feedback is accompanied by heating and vapour formation. This can have adverse effects on the foaming agent. This can also have an adverse effect on the operation of a sensor, for instance a flow meter. This then results in an unreliable and less than optimal admixing.

A further advantage of controlling the assembly of booster pump and metering pump with a single controller is that a coupling of the metering pump to another supply container of auxiliary agent can be carried out in simple manner. This connecting and disconnecting is frequently necessary in practice. At a capacity of 15,000 litres per minute per pump and desired admixing of 10% foaming agent, a total of 135,000 litres of foaming agent is thus for instance needed for 1.5 hours of use, as is usually desired in the case of an oil tank fire. If admixing of 1% or 3% foam were desired, a supply of 40,500 litres will be necessary per pump system at 3% admixing. About 14,000 litres is transported per trailer. Trailers must therefore be switched regularly. Every individual trailer is conventionally provided with its own transfer pump. According to the invention, at the set-up location the trailers are driven up to the metering pump and/or the metering pump is placed close to the trailers with supply. By having for instance two (or more) trailers within reach simultaneously it is possible to switch quickly without stopping the foam feed. It will be apparent that this enhances firefighting.

The pump system is preferably provided here with one or more sensors connected operatively to the controller for the purpose of improving the control of the metering pump in particular. Such sensors are for instance a pressure gauge and a flow meter. This enables the mobile pump system to be controlled automatically or semi-automatically, whereby preferably one central controller controls all components. It is particularly advantageous in situations where the mobile pump system is utilized exclusively in emergency situations. In such situations users/operators have limited experience, and an autonomous or semi-autonomous system is much preferred for thereby ensuring the utility of the pump system.

In an advantageous embodiment according to the invention the coupling means comprise a first connection for a first container and a second connection for a second container.

Providing a first and a second connection makes switching between individual containers relatively simple. More particularly, when a first container becomes empty, the second container can already be activated such that the combating of an emergency situation is not impeded thereby. It will be apparent that this considerably improves the combating of such an emergency situation, such as an oil well fire.

The first and second connections are preferably provided with separate shut-off valves. Switching during use is hereby simplified still further, and the utility of the mobile pump systems according to the invention is increased still further.

In an advantageous embodiment according to the invention the mobile pump system further comprises a reel for enabling a displacement of the metering pump using the metering pump frame. The reel (set) is preferably used for the hydraulic drive. This greatly increases the utility of the metering pump and the mobile pump system as a whole.

In a further advantageous embodiment according to the invention the mobile pump system further comprises a control panel for operating and/or setting the pump system.

Providing a control panel further simplifies the operation for an operator. The effect already stated above of an operationally reliable application is hereby realized, also in situations where the mobile pump system according to the invention is used infrequently and operators therefore have little experience.

In a currently preferred embodiment the control panel is provided on the outer side of the frame. Providing the control panel on the outer side increases the convenience of use. It is also prevented that noise emission is increased in that the mobile pump system is not arranged in a closed frame and an operator must enter the housing in order to control the system. In a preferred embodiment according to the invention the frame is provided with a container-type housing, preferably provided with insulated walls, whereby noise emission is reduced still further. By providing the control panel on the outer side this noise restriction is also maintained during use.

The present invention further relates to a method for pumping water for extinguishing with an auxiliary agent, the method comprising the steps of:

providing a mobile pump system in an embodiment according to the invention as described above;

placing the mobile pump system;

activating the mobile pump system;

metering the auxiliary agent; and pumping water for extinguishing with the auxiliary agent.

The method provides similar advantages and effects as described for the mobile pump system.

In a further advantageous embodiment the method comprises of autonomously controlling the mobile pump system. This is particularly advantageous in mobile pump systems which are only utilized to limited extent, for instance exclusively in emergency situations, as already described above for the mobile pump system.

Further advantages, features and details of the invention are elucidated on the basis of preferred embodiments thereof, wherein reference is made to the accompanying drawings, in which.

Figure 1:
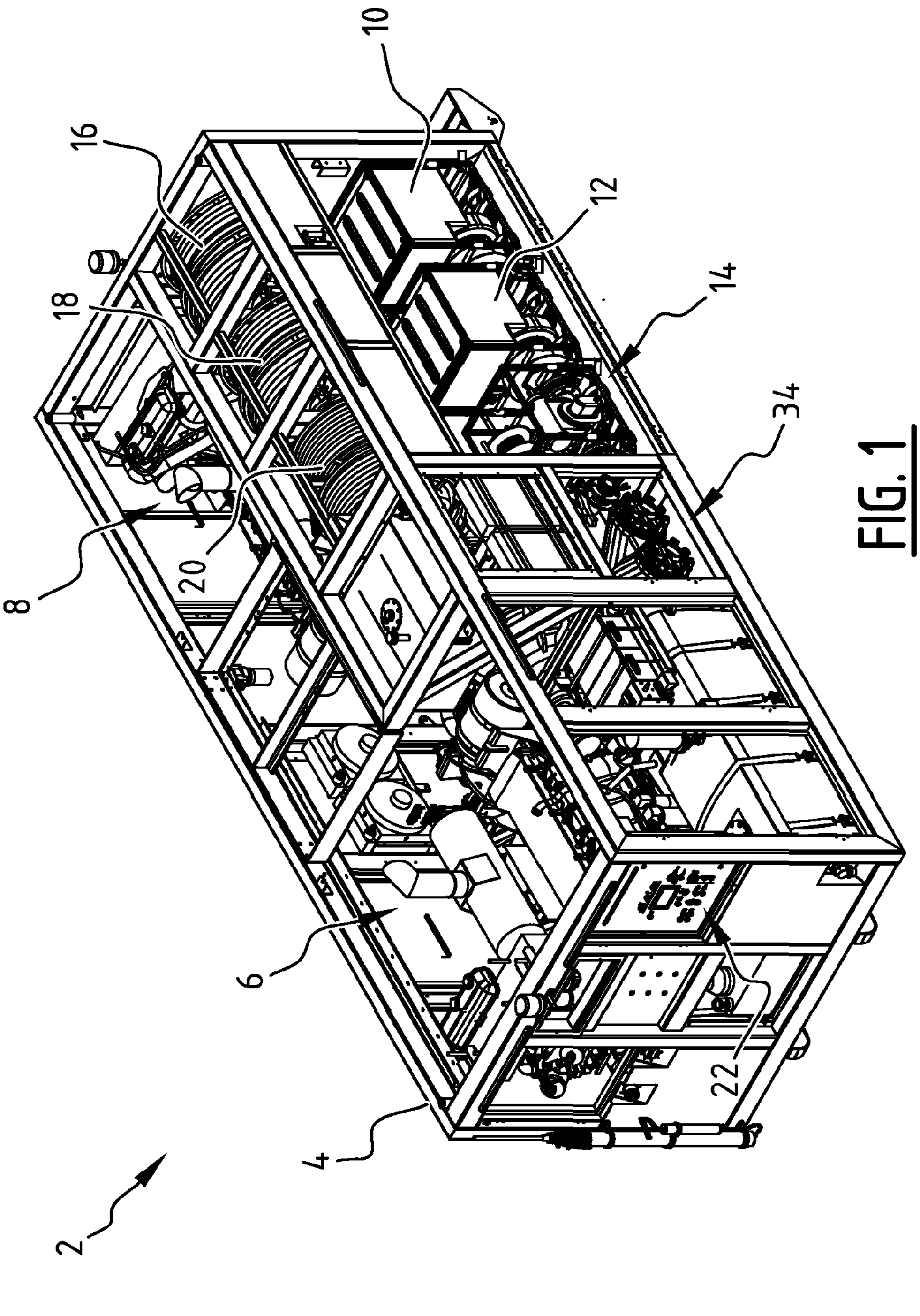
FIG. 1 is a view of a mobile pump system according to the invention.
Figure 2:
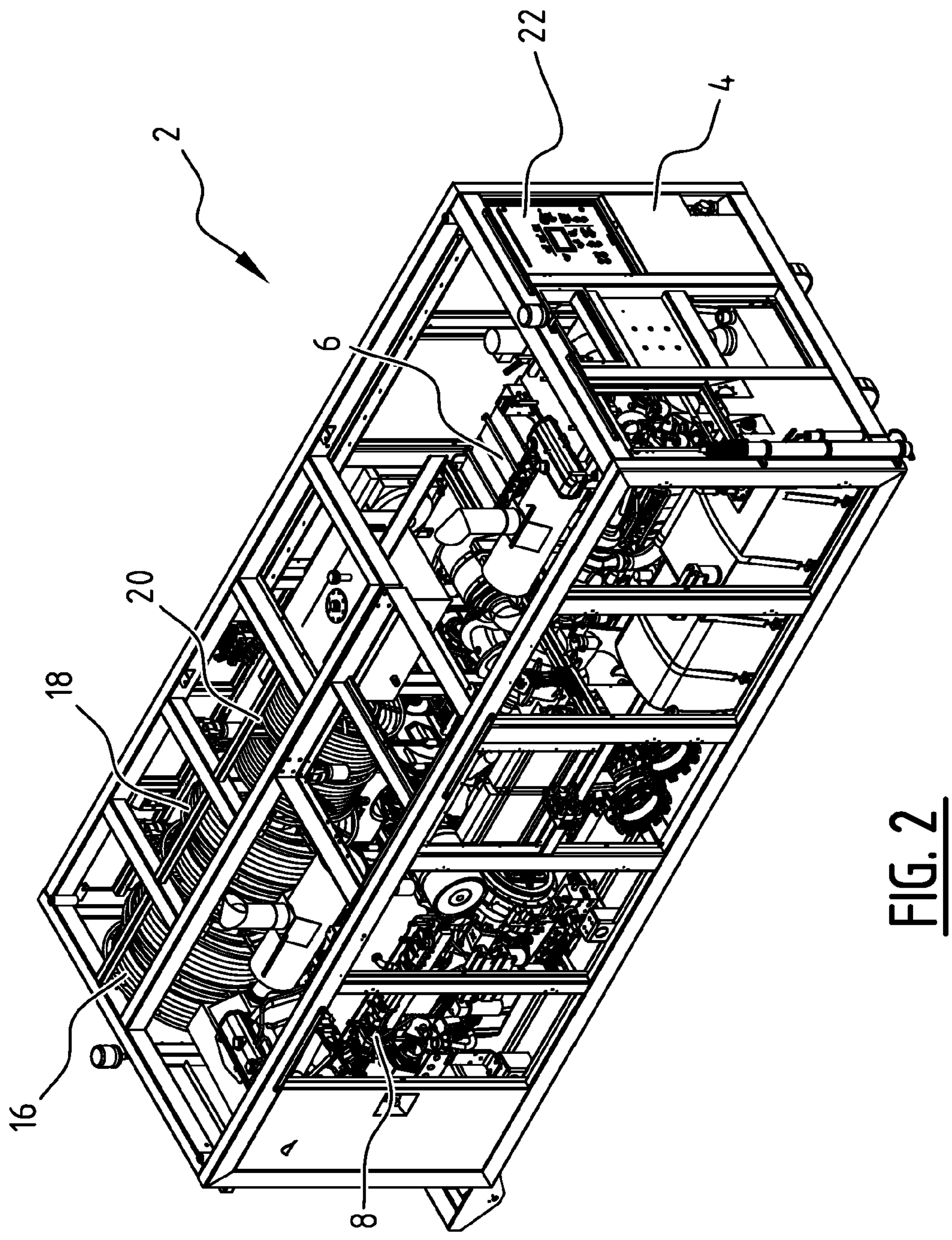
FIG. 2 is a further view of the pump system of FIG. 1.

Mobile pump system 2 (FIGS. 1 and 2) is provided with container 4 as a frame in which booster pump (diesel) motor drive 6 is arranged for the purpose of pumping the water. Also arranged in container 4 is hydraulics motor drive 8 for other components, including (optional) submersible pumps 10, 12, metering pump or foam pump 14, booster pump 24 and ventilation. In the shown embodiment mobile pump system 2 is further provided with two hydraulic submersible pumps 10, 12 for supplying water. A removable foam pump 14 is also arranged. Submersible pumps 10, 12 and foam pump 14 are provided with respective reel sets 16, 18 and 20. Control panel 22 is further arranged on the outer side of container 4.

In a currently preferred embodiment the user opts to start drive 6, after which hydraulics drive 8 is started at a desired moment by controlling control panel 22, preferably followed by the booster pump.

Figure 3:
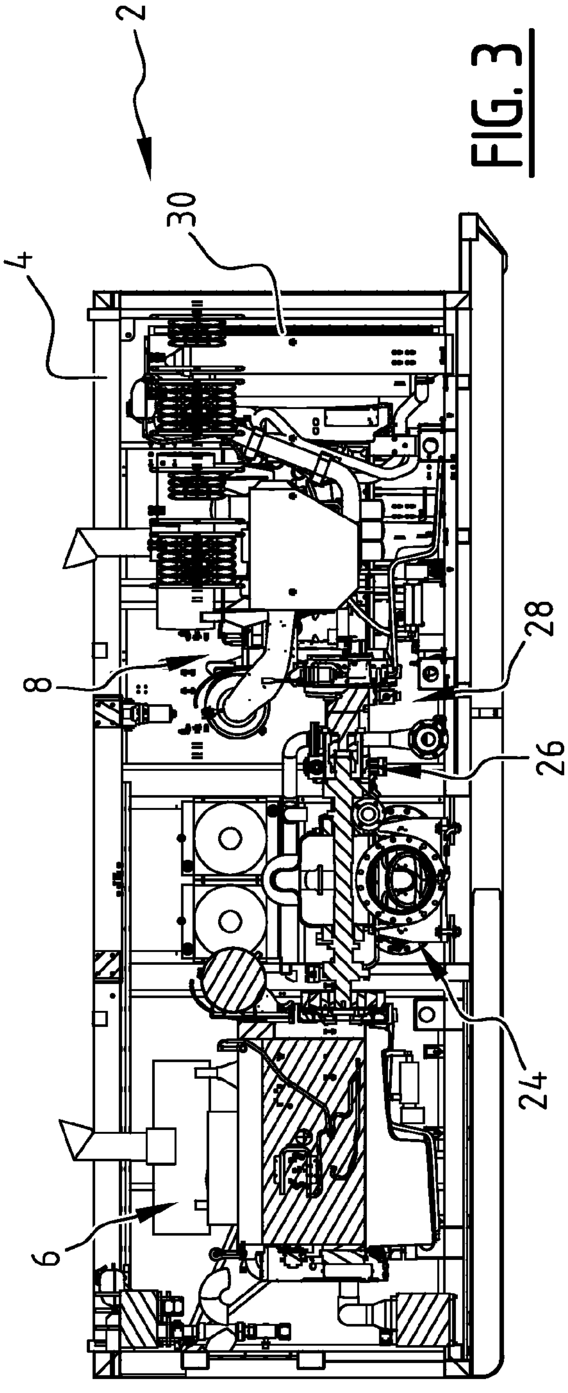
FIG. 3 is a cross-section of the pump system of FIG. 1.

Booster pump motor drive 6 (FIG. 3) is used to drive booster pump 24. In the shown embodiment coupling 26 is operatively connected to hydraulic drive 28, which is powered by hydraulics motor drive 8. Hydraulics motor drive 8 is provided with radiator 30 for cooling.

Figure 4:
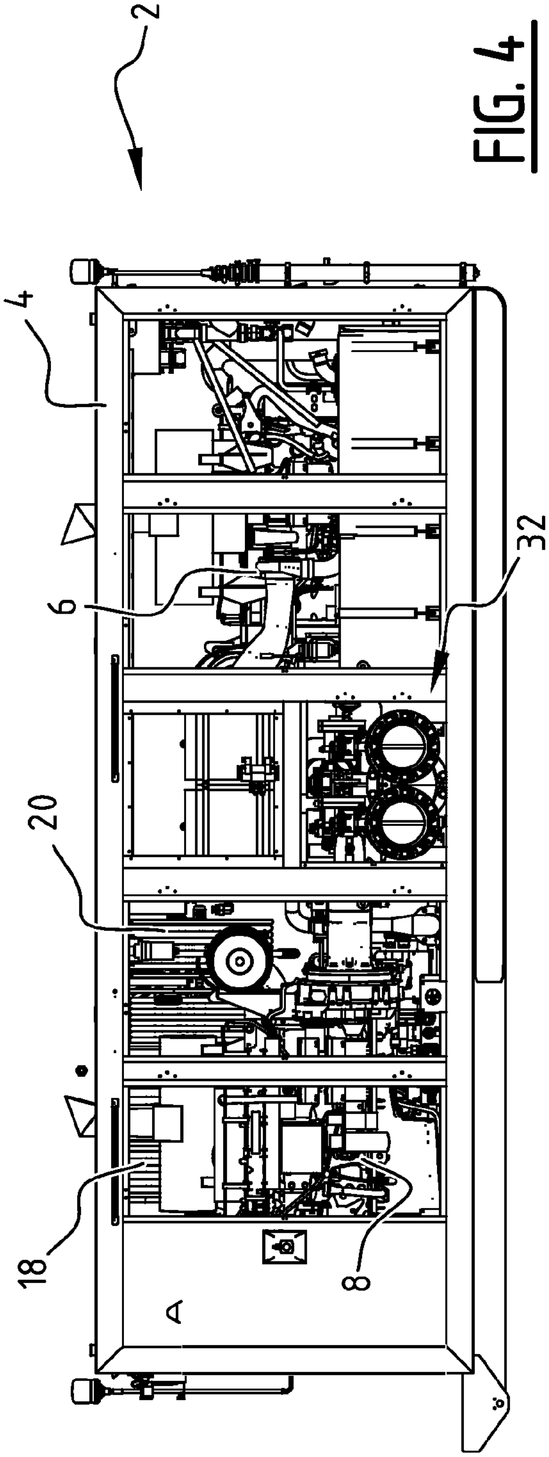
FIG. 4 is a side view of the pump system according to FIG. 1.
Figure 5:
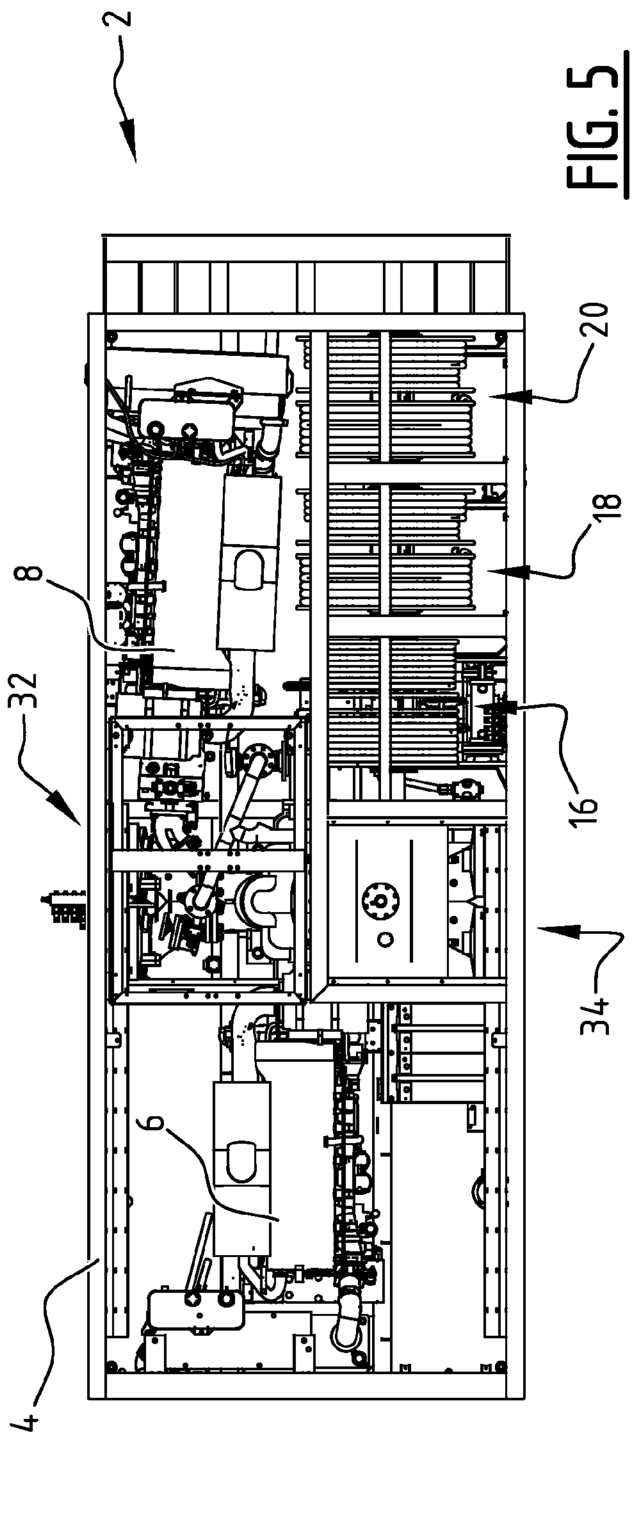
FIG. 5 is a top view of pump system 1.

Outlet 32 (FIGS. 4, 5) of pump system 2 is preferably operatively connected to an extinguishing conduit or discharge. Inlet/feed 34 (FIGS. 1, 5) is further operatively connected during use to a feed conduit for supply of, among other things, water for extinguishing.

Figure 6:
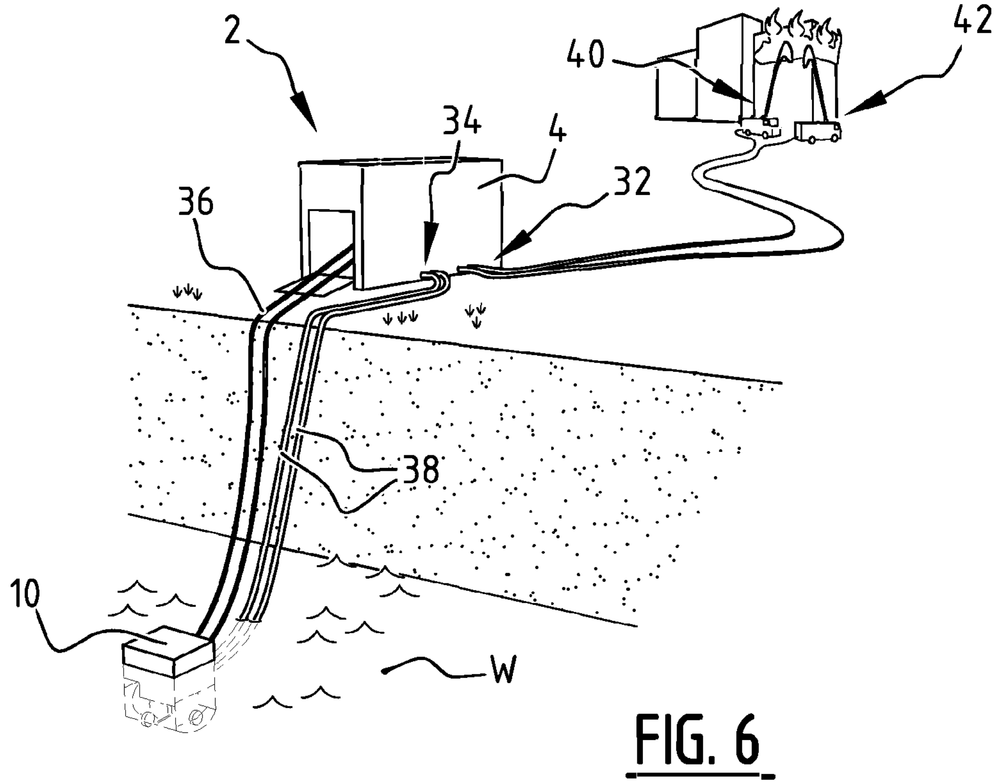
FIG. 6 is a view of the pump system in a situation of use while combating a source of fire.

During use (FIG. 6) pump system 2 with container 4 is placed close to waterway W or another water supply. Conduits 36 then run between container 4 and submersible pump 10 which is placed in water W. Extinguishing conduits 38 form a connection via inlet/feed 34 and outlet 32 in/on container 4 to spray nozzles 40, 42 for the purpose of combating a source of fire.

Figure 7:
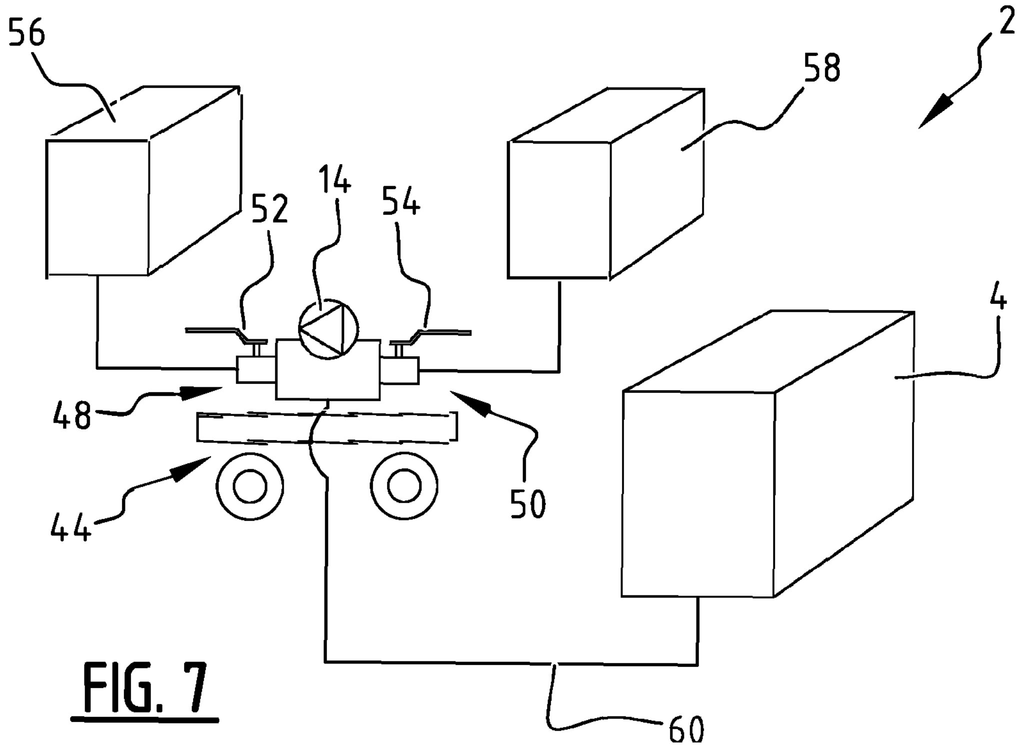
FIG. 7 is a view of the pump system in a situation of use with the addition of an additive.

In a possible application mobile pump system 2 with container 4 is utilized to combat for instance (oil well) fires. Foam can here be applied as extinguishing agent. Applied for this purpose is foam pump 14 with displaceable frame 44 and provided with a double coupling 46 with connections 48, 50 which are provided with shut-off valves/(ball) valves 52,54 (FIG. 7). Foam pump 14 can hereby be connected to containers/IBCs 56, 58 for the purpose of supplying foaming agent. Foaming agent is hereby transported further from containers 56, 58 and conduits 60 in the direction of container 4, and there added to for instance the water for extinguishing in order to realize the desired foaming.

In the case of an emergency situation, such as a fire or flood, mobile pump system 2 is placed close to a waterway W. In the shown embodiment one or more submersible pumps 10, 12 are placed in waterway W. Foam pump 14 is optionally placed close to the foaming agent which is for instance supplied in containers 56, 58. Owing to the double coupling 46 to valves 52, 54, switching from an almost empty container to a new container is greatly simplified without interfering with the combating of the emergency situation. When starting up the operation, the user preferably switches on hydraulics drive 8 on the control panel. Booster pump motor drive 6 is preferably started automatically by the controller of the control panel. Drives 6, 8 are hereby utilized at the most optimal operating point possible. A user can optionally also control booster pump and/or hydraulics motor drives 6, 8 manually.

In a currently preferred embodiment use is made of two substantially identical 585 kW motor drives, wherein hydraulics motor drive 8 can be utilized partially for inter alia hydraulic submersion pumps 10, 12 and partially for booster pump 24. In a comparative test mobile pump system 2 was compared to a conventional pump system provided with an 800 kW booster pump and a 240 kW hydraulic submersible pump. In this conventional system use is made here of a motor drive for the booster pump made suitable specifically therefor. The comparison shows that emission is considerably greater in such conventional systems as compared to pump system 2 according to the invention, or the costs are at least considerably higher. It has been found that in mobile pump system 2 according to the invention two drives 6,8, which are preferably provided with the same power, bring about a significant reduction in emissions. This is the case for both exhaust emission and noise emission. It has been found that such a preferred embodiment results in wide utility, lower costs and greatly reduced exhaust emission and noise emission.

The present invention is by no means limited to the above described preferred embodiments thereof. The rights sought are defined by the following claims, within the scope of which many modifications can be envisaged.

The invention claimed is:

1. A mobile pump system for pumping water and/or an extinguishing agent, the mobile pump system comprising:

- a frame for housing the mobile pump system;
- a container-type housing enclosing the frame, the container-type housing comprising a plurality of walls, the plurality of walls comprising sound insulation for reducing noise emissions from within the housing;
- a booster pump arranged in the frame for the purpose of pumping a water flow;
- a metering pump arranged in the frame for the purpose of adding an auxiliary agent to the water flow, the metering pump comprising a displaceable metering pump frame and coupling means for connecting the metering pump to a container of the auxiliary agent;
- a drive configured to drive the booster pump and the metering pump; and
- a controller configured to control the booster pump and the metering pump;
- wherein the controller is configured to continuously monitor and control the booster pump and the metering pump to achieve a desired mixing ratio of the auxiliary agent in the water flow;
- wherein the coupling means comprise a first connection for a first container and a second connection for a second container;
- wherein the first and second connections are provided with separate shut-off valves;
- wherein the first container is a container of the auxiliary agent; and
- wherein the second container is a container of the auxiliary agent.

2. The mobile pump system according to claim 1, wherein the auxiliary agent comprises a foaming agent.

3. The mobile pump system according to claim 2, comprising a control panel for operating and/or setting the mobile pump system.

4. The mobile pump system according to claim 3, wherein the control panel is provided on the outer side of the frame.

5. The mobile pump system according to claim 1, comprising a reel for displacing the metering pump.

6. The mobile pump system according to claim 5, comprising one or more sensors operatively connected to the controller for controlling the metering pump.

7. The mobile pump system according to claim 1, comprising a control panel for operating and/or setting the mobile pump system.

8. The mobile pump system according to claim 7, wherein the control panel is provided on an outer side of the frame.

9. The mobile pump system according to claim 1, comprising one or more sensors operatively connected to the controller for controlling the metering pump.

10. A method for pumping water and/or an extinguishing agent, the method comprising steps of:

- providing a mobile pump system for pumping water and/or an extinguishing agent, the mobile pump system comprising:
  - a frame for housing the mobile pump system;
  - a container-type housing enclosing the frame, the container-type housing comprising a plurality of walls, the plurality of walls comprising sound insulation for reducing noise emissions from within the housing;
  - a booster pump arranged in the frame for the purpose of pumping a water flow;
  - a metering pump arranged in the frame for the purpose of adding an auxiliary agent to the water flow, the metering pump comprising a displaceable metering pump frame and coupling means for connecting the metering pump to a container of the auxiliary agent;
  - a drive configured to drive the booster pump and the metering pump,
  - a controller configured to control the booster pump and the metering pump;
- placing the mobile pump system;
- activating the mobile pump system;
- metering the auxiliary agent; and
- pumping water for extinguishing with the auxiliary agent, wherein the controller continuously monitors and controls the booster pump and the metering pump to achieve a desired mixing ratio of the auxiliary agent in the water flow;

wherein the coupling means comprise a first connection for a first container and a second connection for a second container;

wherein the first and second connections are provided with separate shut-off valves;

wherein the first container is a container of the auxiliary agent; and wherein the second container is a container of the auxiliary agent.

11. The method according to claim 10, comprising autonomously controlling the mobile pump system.

12. A mobile pump system for pumping water and/or an extinguishing agent, the mobile pump system comprising:

a frame for housing the mobile pump system;

a container-type housing enclosing the frame, the container-type housing comprising a plurality of walls, the plurality of walls comprising sound insulation for reducing noise emissions from within the housing;

a booster pump arranged in the frame for the purpose of pumping a water flow;

a metering pump arranged in the frame for the purpose of adding an auxiliary agent to a water flow, the metering pump comprising a displaceable metering pump frame and coupling means for connecting the metering pump to a container of the auxiliary agent; and a drive configured to drive the booster pump and the metering pump, a controller configured to control the booster pump and the metering pump; and one or more sensors operatively connected to the controller for the purpose of controlling the metering pump;

wherein the controller is configured to continuously monitor and control the booster pump and the metering pump to achieve a desired mixing ratio of the auxiliary agent in the water flow;

wherein the coupling means comprise a first connection for a first container and a second connection for a second container;

wherein the first and second connections are provided with separate shut-off valves;

wherein the first container is a container of the auxiliary agent; and wherein the second container is a container of the auxiliary agent.

13. The mobile pump system according to claim 12, comprising a reel for displacing the metering pump.

14. The mobile pump system according to claim 12, comprising a control panel for operating and/or setting the mobile pump system.

15. The mobile pump system according to claim 14, wherein the control panel is provided on an outer side of the frame.

16. The mobile pump system according to claim 12, wherein the auxiliary agent comprises a foaming agent.

* * * * *